(12) United States Patent
Andersson (10) Patent No.: US 11,370,443 B2
(45) Date of Patent: Jun. 28, 2022

(54) METHOD FOR CONTROLLING A POWERTRAIN SYSTEM DURING UPSHIFTING

(71) Applicant: VOLVO TRUCK CORPORATION, Gothenburg (SE)

(72) Inventor: Arne Andersson, Mölnlycke (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 9 days.

(21) Appl. No.: 16/970,235

(22) PCT Filed: Feb. 26, 2018

(86) PCT No.: PCT/EP2018/054707
§ 371 (c)(1),
(2) Date: Aug. 14, 2020

(87) PCT Pub. No.: WO2019/161935
PCT Pub. Date: Aug. 29, 2019

(65) Prior Publication Data
US 2021/0362721 A1 Nov. 25, 2021

(51) Int. Cl.
*B60W 30/19* (2012.01)
*B60W 10/02* (2006.01)
(Continued)

(52) U.S. Cl.
CPC ............ *B60W 30/19* (2013.01); *B60W 10/02* (2013.01); *B60W 10/06* (2013.01); *B60W 10/11* (2013.01);
(Continued)

(58) Field of Classification Search
CPC ...... B60W 30/19; B60W 10/02; B60W 10/30; B60W 10/06; B60W 10/11;
(Continued)

(56) References Cited

U.S. PATENT DOCUMENTS

| 4,572,114 A | 2/1986 | Sickler |
| 5,425,689 A | 6/1995 | Genise |

(Continued)

FOREIGN PATENT DOCUMENTS

| DE | 102018128038 A1 * | 5/2020 | ............ F02D 13/04 |
| EP | 0849110 A2 | 6/1998 | |

(Continued)

OTHER PUBLICATIONS

International Search Report and Written Opinion dated Nov. 8, 2018 in corresponding International PCT Application No. PCT/EP2018/054707, 11 pages.

(Continued)

*Primary Examiner* — Roger L Pang
(74) *Attorney, Agent, or Firm* — Venable LLP; Jeffri A. Kaminski (57) ABSTRACT

The invention relates to a method (100) for controlling a powertrain system (10) of a vehicle (1) during gear upshifting, said powertrain system comprising: an internal combustion engine system (11) comprising an internal combustion engine (12) configured to output a rotational speed (W1) via an engine output shaft (8); a transmission arrangement (14) having a number of gear stages to obtain a set of gears, the transmission arrangement being operatively connected to the internal combustion engine via a transmission input shaft (64) and further having a transmission output shaft (24) for providing a rotational speed to one or more drive wheels (26) of the vehicle; the method comprising the steps of: operating (110) the engine in a four-stroke operation to provide engine rotational speed output via the engine output shaft; receiving (120) an indication of an intended upshifting from a gear of the set of gears to a higher gear of the sets of gears; reducing (130) the rotational speed of the engine output shaft by adjusting the operation of the engine from (Continued)

the four-stroke operation to a two-stroke braking operation; and, when said engine is in the two-stroke braking operation, performing (140) the intended upshifting from said gear of the set of gears to said higher gear of the sets of gears.

14 Claims, 5 Drawing Sheets

(51) Int. Cl.
*B60W 10/06* (2006.01)
*B60W 10/11* (2012.01)
*B60W 10/30* (2006.01)
*F02B 69/06* (2006.01)
*F02B 75/02* (2006.01)
*F02D 13/04* (2006.01)
*F02D 41/00* (2006.01)
*F02D 41/02* (2006.01)

(52) U.S. Cl.
CPC ............ *B60W 10/30* (2013.01); *F02B 69/06* (2013.01); *F02B 75/02* (2013.01); *F02D 13/04* (2013.01); *F02D 41/0007* (2013.01); *F02D 41/023* (2013.01); *B60W 2710/0644* (2013.01); *F02B 2075/025* (2013.01); *F02B 2075/027* (2013.01)

(58) Field of Classification Search
CPC ............ B60W 2710/0644; F02B 75/02; F02B 2075/027; F02B 2075/025; F02B 69/06; F02D 13/04; F02D 41/0007; F02D 41/023

USPC ......................................................... 477/109
See application file for complete search history.

(56) References Cited

U.S. PATENT DOCUMENTS

| 5,507,261 | A | 4/1996 | Johnson, Jr. |
| 5,947,863 | A * | 9/1999 | Grob .................... B60W 30/18 477/109 |
| 6,503,171 | B1 | 1/2003 | Böckmann et al. |
| 6,855,090 | B2 * | 2/2005 | Tabata ................. B60W 10/06 477/107 |
| 7,077,024 | B2 | 7/2006 | Lauri et al. |
| 2009/0038584 | A1 | 2/2009 | Schmid et al. |
| 2009/0325761 | A1 | 12/2009 | Sumilla et al. |
| 2012/0165155 | A1 | 6/2012 | Sumilla et al. |
| 2015/0082781 | A1 * | 3/2015 | Devani ................. F02D 41/009 60/327 |

FOREIGN PATENT DOCUMENTS

| EP | 0961870 B1 | 3/2004 |
| WO | 2016060605 A1 | 4/2016 |

OTHER PUBLICATIONS

International Preliminary Report on Patentability dated Jun. 10, 2020 in corresponding International PCT Application Mo. PCT/EP2018/054707, 19 pages.

* cited by examiner

METHOD FOR CONTROLLING A POWERTRAIN SYSTEM DURING UPSHIFTING

CROSS-REFERENCE TO RELATED APPLICATIONS

This application is a U.S. National Stage application of PCT/EP2018/054707, filed Feb. 26, 2018, and published on Aug. 29, 2019, as WO 2019/161935 A1, all of which is hereby incorporated by reference in its entirety.

TECHNICAL FIELD

The invention relates to a method for controlling a powertrain system of a vehicle during gear upshifting. By way of example, the powertrain system comprises an internal combustion engine system having an internal combustion engine configured to output a rotational speed via an engine output shaft and a transmission arrangement having a number of gear stages to obtain a set of gears, each one of the gears having a corresponding gear ratio. The invention also relates to control unit for controlling a powertrain system, the control unit being configured to perform a method of controlling the powertrain system.

The invention is applicable on various types of vehicles, in particular heavy-duty vehicles, such as trucks, buses, construction equipment, working machines e.g. wheel loaders, articulated haulers, dump trucks, excavators and backhoe loaders etc. Although the invention will mainly be described in relation to a truck, the invention is not restricted to this in particular, but may also be used in other vehicles such as working machines.

BACKGROUND

In recent years, the control of a vehicle during gear shifting has been continuously developed so as to allow the vehicle to be operated smoothly in a number of situations, such as when a truck is operated at a certain speed with a certain load. In connection with heavy-duty vehicles, such as heavy-duty trucks, the powertrain system of the vehicle is often configured to provide automatic gear shifting to further enhance the operation of the vehicle.

For this type of vehicles, various electronic control systems of the powertrain system of the vehicle have also been affected by the development of software and have become more accurate, more rapid and more adaptable to prevailing states of the engine and the surrounding environment. By way of example, the combustion process can be controlled according to each operating situation. The speed of the engine can therefore be controlled accurately. An engine can also be equipped with an engine braking control system to be used as an auxiliary brake. Auxiliary brakes are normally used in heavy-duty vehicles with the purpose of sparing the service brakes of the vehicle, in particular on long downhill gradients when it is desirable to brake in order to maintain a reasonably constant speed.

In other words, a conventional powertrain system for a heavy-duty vehicle may typically include an automotive automatic transmission cooperating with an engine braking device or an engine braking control system. Engine braking may be provided in several different ways, but refers typically to engine brakes such as compression brakes and exhaust brakes (i.e. a valve in the exhaust pipe). In addition to using engine braking for braking the vehicle itself, i.e. as a supplement to the wheel brakes of the vehicle, it is also known to use engine braking during shifting in vehicles with an automated transmission arrangement. By braking the rotational speed of the engine output shaft, more rapid speed adaptation from a high speed to a lower speed can be effected.

In this context, U.S. Pat. No. 7,077,024 B2 discloses an arrangement and method for upshifting gear in a motor vehicle. The arrangement comprises an internal combustion engine with an engine braking device, a multi-stage gearbox, and braking means for braking an intermediate shaft of the multi-stage gearbox. In addition, the engine braking device is configured to adapt the rotational speed of the engine to the rotational speed of an input shaft in a new gear.

Despite the activity in the field, there remains a need for an improved operation of a powertrain system of a vehicle during upshifting. In particular, it would be desirable to further enhance the use of engine braking during gear shifting for a powertrain system of a vehicle to facilitate the ordinary operations of the vehicle.

SUMMARY

An object of the invention is to provide a more efficient method for controlling a powertrain system of a vehicle during gear upshifting, in which an internal combustion engine system is operated to switch from a four-stroke mode to a two-stroke engine 25 braking mode to enable a rotational speed synchronization between an engine and a transmission during upshifting from a gear to another gear.

According to a first aspect of the present invention, there is provided a method for controlling a powertrain system of a vehicle during gear upshifting. The powertrain system comprises an internal combustion engine system comprising an internal combustion engine configured to output a rotational speed via an engine output shaft, a transmission arrangement having a number of gear stages to obtain a set of gears, each one of the gears having a corresponding gear ratio. The transmission arrangement is further operatively connected to the internal combustion engine via a transmission input shaft and has a transmission output shaft for providing a rotational speed to one or more drive wheels of the vehicle.

The method comprises the steps of:
   operating the engine in a four-stroke operation to provide engine rotational speed output via the engine output shaft;
   receiving an indication of an intended upshifting from a gear of the set of gears to a higher gear of the sets of gears;
   reducing the rotational speed of the engine output shaft by adjusting the operation of the engine from the four-stroke operation to a two-stroke braking operation; and
   when the engine is in the two-stroke braking operation, performing the intended upshifting from the gear of the set of gears to the higher gear of the sets of gears.

It is to be noted that the engine output shaft is typically disconnected from the transmission arrangement prior to the step of reducing the rotational speed of the engine output shaft. However, it may in some example embodiments be enough that the gears of the transmission arrangement are in a disengaged state prior to the step of reducing the rotational speed of the engine output shaft.

By the steps of the method according to the example embodiments, it becomes possible to increase the performance of the powertrain system during upshifting. That is, by the provision of reducing the rotational speed of the engine output shaft by adjusting the operation of the engine from the four-stroke operation to the two-stroke braking operation, the upshifting from one gear to the higher gear can be performed while maintaining the exhaust gas flow from the engine. The method according to the example embodiments is particularly useful in a powertrain system utilizing a turbocharger arrangement intended for increasing the amount of air entering the engine to create more power since the rotational speed of the turbocharger can be maintained by ensuring that the flow of exhaust gases from the engine to the turbocharger is upheld by the method. This is possible partly because the two-stroke braking operation maintains the turbocharger speed since the combustion cylinder is scavenging air every 360 crank angle degrees (CAD) instead of every 720 CAD.

In other words, when the transmission arrangement of the powertrain system intends to perform an upshifting, the method of the example embodiments is configured to actuate engine braking, i.e. reducing the rotational speed of the engine output shaft, by adjusting the operation of the engine from the four-stroke operation to the two-stroke braking operation.

It is also believed that the example embodiments of the method allows for a more precise control of the engine braking, i.e. the step of reducing the rotational speed of the engine output shaft, as well as an increased freedom of operation of the engine braking during operation of the powertrain system. In this manner, it becomes possible to further shorten the discontinuation of driving power of the vehicle during upshifting, i.e. the rotational speed of the engine output shaft is adapted to the new gear in a rapid manner. Further, the method enables a rapid release of the engine braking operation.

As the method according to the example embodiments contribute to more rapid gear upshifting, the method will also allow for improved vehicle acceleration, especially at low vehicle speed.

Further, it is believed that operating the engine according to the method of the example embodiments contributes to reducing engine soot emission because the method allows for maintaining the boost in the engine so that full power (or driving torque) can be provided more rapidly when the higher gear is engaged.

Also, it is believed that operating the engine according to the method of the example embodiments contributes to smoother upshifting due to a more precise engine braking and synchronization between the engine output shaft and the transmission arrangement.

It should be noted that although the method is typically intended for a diesel type engine, i.e. a diesel type combustion, the fuel provided for the combustion may in some example embodiments be provided for a premixed combustion, where the fuel may be injected directly into the cylinder or into an air channel upstream of the cylinder, e.g. by port injection. Further, it is to be noted that the method may also be used in an Otto-cycle engine, or a hybrid engine system of a diesel engine and an Otto-cycle engine. It should be noted that the vehicle can be of a variety of alternative types, e.g. it may be a truck, a car, a bus, or a working machine such as a wheel loader or the like.

The vehicle typically comprises the internal combustion engine system, including the internal combustion engine. The engine can be e.g. a four-stroke internal diesel combustion engine. By way of example, the internal combustion engine system comprises a compression ignition internal combustion engine. The internal combustion engine may be e.g. a diesel engine, which as such may be running on several different types of fuel, such as diesel or dimethyl ether, DME. Other fuel types may also be conceivable, such as a renewable fuel as well as hybrid systems comprising an internal combustion engine and an electrical motor. As such, it should be readily appreciated that the example embodiments of the invention as described herein can be implemented in several different designs, both with respect to the engine as such, but also with respect to the cylinder design and the other components of the engine.

Typically, the step of reducing the rotational speed of the engine output shaft is terminated when the step of upshifting from one of the gears to the higher gear is completed, i.e. when the higher gear is engaged in the transmission arrangement. By way of example, the step of reducing the rotational speed of the engine output shaft is terminated when the engine output shaft is in synchronization with the transmission arrangement, e.g. when the engine output shaft is in synchronization with the transmission arrangement input shaft.

In the context of the present invention, "engine braking" typically refers to an operation of the engine system when the retarding forces within the engine are used to slow a vehicle down. When the engine braking device is activated, it opens one or a number of exhaust valves in the cylinder(s) after the compression cycle, thereby releasing the compressed fluid medium trapped in the cylinder(s), and slowing the vehicle.

In the context of the present invention, "four-stroke operation" or "four-stroke mode" typically refers to a conventional engine combustion cycle including a sequence of an intake stroke, a compression stroke, an combustion stroke (or power stroke), and an exhaust stroke. The intake stroke is the stroke of the internal combustion engine when the piston moves from the top dead center (TDC) to the bottom dead center (BDC) and intake gas, preferably in the form of air, is provided into the combustion chamber. The compression stroke is the stroke of the internal combustion engine when the piston moves from the BDC to the TDC while the piston compresses the air-fuel mixture in preparation for ignition during the power stroke. Both the intake and exhaust valves are typically closed during this stage. The combustion stroke is the stroke of the internal combustion engine when the piston moves from the TDC to the BDC. While the piston is at the TDC, the compressed air-fuel mixture is ignited by a spark plug (in a gasoline engine) or by heat generated by high compression (diesel engines), which forcefully returns the piston to the BDC. The exhaust stroke on the other hand is the stroke of the internal combustion engine when the piston moves from the BDC to the TDC and exhaust combusted exhaust gases through the exhaust valve. In general, the operation of the engine when operated according to the four-stroke operation corresponds to a repetitive engine operation every second crankshaft revolution.

In the context of the present invention, "two-stroke braking operation" or "two-stroke braking mode" refers to a cycle of the internal combustion engine, in which the piston moves two strokes (up and down movements) between the TDC and the BDC during only one crankshaft revolution, while the internal combustion engine is operated to reduce the rotational speed of the engine output shaft. Generally, in the two-stroke braking operation, the exhaust valve(s) typically open(s) four times per 720 CAD, i.e. two crankshaft revolutions. Thus, during each crankshaft revolution in the two-stroke braking operation, the first opening of the exhaust valve during the two-stroke braking operation typically occurs when the piston moves from the BDC position to the TDC position. In this position, the exhaust valve is opened to receive a fluid medium, such as compressed air, from the exhaust channel of the powertrain system. Also, during each crankshaft revolution in the two-stroke braking operation, the second opening of the exhaust valve during the two-stroke braking operation occurs just before the TDC position. In this position, the exhaust valve discharges burnt gases to the exhaust channel.

In general, the operation of the engine when operated in a general two-stroke operation corresponds to a repetitive engine operation every crankshaft revolution.

The wordings "top dead center" and "bottom dead center" should be construed as respective upper and lower end positions for the reciprocating motion of the piston within the combustion cylinder. When stating that a valve is opened and closed at one of the top dead center and bottom dead center, it should be realized that some tolerances are within the scope of the specific definition. For example, when stating that the inlet valve is opened, i.e. positioned in the open position when the piston reaches the top dead center, the inlet valve must not necessarily be opened at the exact top dead center position of the piston, but can be opened slightly before the piston reached the top dead center, or slightly after the piston has left the top dead center.

As mentioned above, the internal combustion engine is typically connectable to a turbocharger arrangement. In particular, the internal combustion engine arrangement has an exhaust passage connected to the turbocharger arrangement.

Thus, according to one example embodiment, the powertrain system further comprises a turbocharger arrangement having a turbine receiving exhaust gases from the internal combustion engine and a compressor for compressing intake air and feeding the intake air via an air intake line to the internal combustion engine. Moreover, the turbine is configured to convert engine exhaust gas into mechanical energy to drive the compressor.

In this example embodiment, the method typically further comprises the step of providing a flow of exhaust gases to the turbine during the step of performing the intended upshifting, thereby allowing the turbine to operate the compressor when the engine is in the two-stroke braking operation.

By ensuring that there is a flow of exhaust gases to the turbine during the step of performing the intended upshifting, it is believed that the general efficiency of the powertrain system is improved because the rotational speed of the turbocharger can be maintained, thus contributing to uphold the efficiency of the engine. This may also typically have a positive impact on the overall fuel consumption and the level of emissions in the exhaust gases from the engine.

Typically, although not strictly required, the step of reducing the rotational speed of the engine output shaft is performed until the rotational speed of the engine output shaft is in a synchronous condition with a predetermined transmission input shaft rotational speed. The predetermined transmission input shaft rotational speed typically corresponds to the rotational speed of the input shaft relating to the higher gear. Data relating to the predetermined transmission input shaft rotational speed corresponding to the higher gear is generally obtained from the control unit.

In addition, or alternatively, the step of reducing the rotational speed of the engine output shaft is performed until the rotational speed of the engine output shaft is in a synchronous condition with a predetermined transmission output shaft rotational speed of the higher gear. The predetermined transmission output shaft rotational speed typically corresponds to the rotational speed of the output shaft relating to the higher gear. Data relating to the predetermined transmission output shaft rotational speed corresponding to the higher gear is generally obtained from the control unit.

According to one example embodiment, the intended upshifting from the gear of the set of gears to the higher gear of the sets of gears is performed by setting the transmission in a neutral position and directly synchronizing the engine output shaft rotational speed with the transmission input shaft rotational speed.

According to one example embodiment, the powertrain system further comprises a clutch for operatively connecting the engine to the transmission arrangement. In this example embodiment, the method typically comprises the step of decoupling the engine output shaft from the transmission input shaft by the clutch prior to the step of reducing the rotational speed of the engine output shaft by adjusting the operation of the engine from the four-stroke operation to the two-stroke braking operation. The clutch may be a single clutch unit, a dual-clutch unit, or any other type of multi-clutch unit.

According to one example embodiment, the engine system comprises at least one cylinder having a combustion chamber and a number of exhaust valves in fluid communication with the combustion chamber and configured to regulate the evacuation of exhaust gases from the combustion chamber. Moreover, at least one of the exhaust valves comprises a flow control valve assembly adapted to regulate the flow of a fluid medium passing through the flow control valve assembly.

In addition, or alternatively, at least one of the inlet valves comprises a flow control valve assembly adapted to regulate the flow of a fluid medium passing through the flow control valve assembly.

By using a flow control valve assembly configured to regulate the flow of fluid medium there through, it becomes possible to improve the controllability of the step of reducing the rotational speed of the engine output shaft by adjusting the operation of the engine from the four-stroke operation to the two-stroke braking operation.

In addition, the flow control valve assembly typically provides an enhanced level of freedom of operation as well as reducing the time needed for adjusting the operation of the engine from the four-stroke operation to the two-stroke braking operation.

According to one example embodiment, the step of reducing the rotational speed of the engine output shaft by adjusting the operation of the engine from the four-stroke operation to the two-stroke braking operation is performed by controlling the flow control valve assembly to open at least one of the exhaust valves. In this manner, the switch from the four-stroke operation to the two-stroke braking operation is performed by changing the motion of the exhaust valve. Since the exhaust flow control valve assembly can be operated to open and close the exhaust valve every combustion cycle, the response time of the switch between the operations becomes rapid.

In addition, or alternatively, the step of reducing the rotational speed of the engine output shaft by adjusting the operation of the engine from the four-stroke operation to the two-stroke braking operation is performed by controlling the flow control valve assembly to open at least one of the inlet valves.

According to one example embodiment, the step of reducing the rotational speed of the engine output shaft by adjusting the operation of the engine from the four-stroke operation to the two-stroke braking operation is performed by controlling the flow control valve assembly to open at least one of the inlets valves and at least one of the exhaust valves.

Typically, the step of reducing the rotational speed of the engine output shaft by adjusting the operation of the engine from the four-stroke operation to the two-stroke braking operation is performed by controlling the flow control valve assembly to open each one of the exhaust valves for the given combustion cylinder.

According to one example embodiment, the step of reducing the rotational speed of the engine output shaft by adjusting the operation of the engine from the four-stroke operation to the two-stroke braking operation is performed by operating an actuator of the flow control valve assembly.

By way of example, the step of reducing the rotational speed of the engine output shaft by adjusting the operation of the engine from the four-stroke operation to the two-stroke braking operation is performed by operating the actuator of the flow control valve assembly to control a valve parameter relating to any one of valve opening size, valve opening timing, valve opening duration, flow area, flow time, valve lift or a combination thereof.

Further, by using at least one flow control valve assembly, as mentioned above, it becomes possible to exhaust a short exhaust at an appropriate point of time, and to release the pressure within the cylinder to effect engine braking. That is, by the step of making an exhaust burst, as mentioned above, the engine is operated to release an amount of air and fuel at an appropriate point in time.

The flow control valve assembly can be provided in several different manners. The flow control valve assembly can either be arranged as an inlet flow control valve assembly or as an exhaust flow control valve assembly. Typically, the flow control valve assembly comprises an actuator and a valve member, the actuator being operatively connected to the valve member of the flow control valve assembly. Independently of the type of valve assembly, the valve assembly (or the valve member of the assembly) is operable between an open position and a closed position. In this manner, the flow control valve assembly is adapted to regulate the flow of a fluid medium passing through the flow control valve assembly, i.e. passing through the valve member. The flow control valve assembly can be controlled in various manners. Typically, although not strictly necessary, the exhaust flow control valve assembly comprises an actuator operatively connected to the exhaust valve member. Analogously, the inlet flow control valve assembly comprises an actuator operatively connected to the inlet valve member.

In one example embodiment, the actuator is configured to operate the exhaust valve by means of pneumatic pressure. Accordingly, the actuator is a flow controllable actuator pneumatically operated by pressurized gas for opening and closing the exhaust valve. By way of example, the flow control valve assembly is a pneumatic flow control valve. As such, each exhaust valve has its own actuator controlling the valve position and timing. However, in other example embodiments, a number of exhaust valves may be controlled by common actuator.

An advantage with a pneumatically operated flow control valve assembly is that the exhaust valve can be rapidly controlled between the open and the closed position. Also, the exhaust valve may be operated independently of e.g. the rotation of a cam shaft.

According to one example embodiment, the method further comprises the step of providing the opening force for opening and closing the exhaust valve and the step of providing pressurized fluid to the flow controllable actuator.

The actuator is typically configured to control the opening and closure of the exhaust valve at a given point in time. By way of example, the actuator is typically configured to control the opening and closure of the exhaust valve at a given point in time by receiving a signal from a control unit or the like. Typically, the actuator is typically configured to control the opening and closure of the exhaust valve in response to receiving the indication of the intended upshifting.

In addition, or alternatively, the flow control valve assembly may be a lift valve member configured to regulate the height of the lift valve opening.

Typically, the internal combustion engine arrangement further comprises one or a number of inlet valves. In particular, each one of the cylinders of the internal combustion engine has one or a number of inlet valves.

In addition, or alternatively, one of the inlet valves is a flow control valve assembly. Typically, each one of the inlet valves is a flow control valve assembly. In this manner, it becomes possible to operate an inlet valve in an efficient and fast manner resulting in an even more efficient engine arrangement.

Typically, although not strictly necessary, the method further comprises repeating at least some of the steps mentioned above.

Typically, the number of the inlet valves is maintained in their closed state, when performing the step of reducing the rotational speed of the engine output shaft by adjusting the operation of the engine from the four-stroke operation to the two-stroke braking operation.

However, in another example embodiment, the number of the inlet valves is opened when performing the step of reducing the rotational speed of the engine output shaft by adjusting the operation of the engine from the four-stroke operation to the two-stroke braking operation.

According to one example embodiment, the step of reducing the rotational speed of the engine output shaft by adjusting the operation of the engine from the four-stroke operation to the two-stroke braking operation is performed by utilizing only one exhaust flow control valve assembly of the group of the exhaust valves.

The other valves of the groups of valves not being provided as flow control valve assemblies are typically check valves, non-return valves or the like. These types of valves may for instance be provided as conventional poppet type valves.

According to one example embodiment, each exhaust valve in the group of exhaust valves is a flow control valve assembly, and the method is configured to utilize each one of the exhaust valves in the group of the exhaust valves. If each one of the valves of the group of exhaust valves is a flow control valve, the step of reducing the rotational speed of the engine output shaft by adjusting the operation of the engine from the four-stroke operation to the two-stroke braking operation is performed by utilizing each one of the exhaust flow control valve assemblies in the group of the exhaust valves. By providing a configuration in which each one of the exhaust valves of the group of exhaust valves is a flow control valve assembly, it becomes possible to independently regulate each one of the valves. As such, the regulation of the engine braking and the engine system can be further improved in terms of e.g. flexibility.

It is to be noted that the number of flow control valve assemblies, and the configuration of each valve and the configuration of the number of valves typically depends on the type of installation of the example embodiments, e.g. type of vehicle, type of engine etc.

It is also to be noted that the flow control valve assembly may be provided by another type of flow control valve assembly than the pneumatic flow control valve assembly. Thus, the flow control valve assembly may be any one of an electro-magnetic flow control valve assembly, a pneumatic flow control valve assembly, an electro-pneumatic flow control valve assembly, a hydraulic flow control valve assembly, an electro-hydraulic flow control valve assembly or the like.

Typically, although not strictly required, the step of reducing the rotational speed of the engine output shaft by adjusting the operation of the engine from the four-stroke operation to the two-stroke braking operation is performed by controlling an actuator operatively connected to a valve member of the flow control valve assembly, the valve member being adapted to regulate a valve opening upon a signal from the actuator. The valve member is typically regulated to control the opening, closure, timing and flow area of the valve opening. The actuator is typically configured to control the opening and closure of the valve member at a given point in time. By way of example, the actuator is typically configured to control the opening and closure of the valve member at a given point in time by receiving a signal from a control unit or the like.

By way of example, the valve member is any one of a rotational valve member and a lift valve member.

According to one example embodiment, the step of reducing the rotational speed of the engine output shaft by adjusting the operation of the engine from the four-stroke operation to the two-stroke braking operation is performed within one third of an engine output shaft revolution, as defined from the start of the step of adjusting the operation of the engine from the four-stroke operation to the two-stroke braking operation. In this context, the term "within one third of an engine output shaft revolution" thus refers to a position measured from the start of the step of reducing the rotational speed of the engine output shaft by adjusting the operation of the engine from the four-stroke operation to the two-stroke braking operation. It has been observed that this operation of the engine is particularly useful for an engine comprising six cylinders.

According to one example embodiment, the step of reducing the rotational speed of the engine output shaft by adjusting the operation of the engine from the four-stroke operation to the two-stroke braking operation is initiated during an intake stroke, after an intake stroke or during a compression stroke. During this part of the combustion cycle, the positions of the piston, exhaust valves and inlet valves of the four-stroke operation typically corresponds to the positions of the piston, exhaust valves and the inlet valves of the two-stroke operation. By way of example, the step of adjusting the operation of the engine from the four-stroke operation to the two-stroke braking operation is initiated during 0 CAD to 180 CAD from the top dead center during the four-stroke operation. 0 CAD corresponds to the position of the piston at the start of the intake stroke.

Alternatively, the step of adjusting the operation of the engine from the four-stroke operation to the two-stroke braking operation is initiated during 180 CAD to 310 CAD from the top dead center during the four-stroke operation. 0 CAD corresponds to the position of the piston at the start of the intake stroke.

Typically, although strictly not necessary, the internal combustion engine comprises a plurality of cylinders. Each combustion cylinder has a combustion chamber and a reciprocating piston being movable arranged within the cylinder. Further, according to one example embodiment, the step of reducing the rotational speed of the engine output shaft by adjusting the operation of the engine from the four-stroke operation to the two-stroke braking operation is performed sequentially per cylinder until each one of the cylinders of the plurality of cylinders is performing a two-stroke cycle (i.e. the two-stroke braking operation). Typically, this sequence of switching from the four-stroke operation to the two-stroke braking operation for the number of cylinders is performed during 720 crank angles degrees, which corresponds to two revolutions of the crank shaft.

Typically, the two-stroke braking operation is a non-firing two-stroke operation.

Typically, the internal combustion engine system comprises a control unit for controlling the internal combustion engine. The control unit is configured to perform the steps of the method according to any one of the example embodiments and/or the features as described above.

Typically, although not strictly required, the transmission arrangement is one of a semi-automatic transmission arrangement and an automatic transmission arrangement. Automatic transmission arrangements are common in heavy-duty vehicles to precision-regulate engine speed, engagement and disengagement of e.g. an automated disk-clutch between the engine and the transmission arrangement. An automatic transmission arrangement is typically made up of the input shaft, the intermediate shaft, which has at least one gearwheel in engagement with a gearwheel on the input shaft, and a main shaft with gearwheels which engage with gearwheels on the intermediate shaft. The main shaft is also connected to an output shaft coupled to the driving wheels via, for example, a drive shaft. Each pair of the gearwheels has generally a different ratio compared with another pair of gearwheels in the gearbox. Different gears are obtained by virtue of different pairs of gearwheels transmitting the torque from the engine to the driving wheels. Each gear is usually synchronized, but variants exist where at least some gears are unsynchronized. Speed adaptation is typically effected by means of an intermediate shaft brake (speed reduction of the intermediate shaft) or control of the engine speed (speed increase/reduction). An intermediate shaft brake adapts the speed of the intermediate shaft relatively rapidly to the new lower ratio to be selected; that is to say, intermediate shaft braking takes place during upshifting.

According to one example embodiment, the transmission arrangement comprises an intermediate shaft arranged in the transmission arrangement. Moreover, the transmission arrangement typically comprises a braking device for braking the intermediate shaft arranged in the transmission arrangement.

The term "operatively connected", as used herein, typically means that a first component is in operative relation to another second component. By way of example, the term operatively connected means that the first component is connectable, or connected, to the second component in a manner allowing a transfer of a rotational movement and/or rotational torque from the first component to the second component. Therefore, the term encompasses a functional construction in which two components are connected such that the rotational speed of the first component corresponds to the rotational speed of the second component. However, the term also encompasses a functional construction in which there is a ratio between the rotational movement of the first component and the rotational movement of the second component, i.e., the rotational speed of the second component is proportional to the rotational speed of the first component.

The term "ratio", as used herein for a gear ratio for a transmission, typically refers to the number of revolutions of the input shaft of the transmission divided by the number of revolutions of the output shaft of the transmission. Accordingly, an upshifting from one gear to a higher gear means an upshifting from an engaged gear with a gear ratio to another (higher) gear with another gear ratio, in which the another gear ratio is lower than the gear ratio of the engaged gear.

According to a second aspect of the present invention, there is provided a control unit for controlling the powertrains system. The control unit is configured to perform any one of the steps of the method according to any one of the example embodiments and/or the features as described above in relation to the first aspect of the present invention.

Effects and features of the second aspect are largely analogous to those described above in relation to the first aspect of the present invention.

It should be noted that the control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

As mentioned above, the control unit may be a digital control unit; however, the control unit may also be an analog control unit.

In addition, the control unit may be configured to control each one of the valves; in particular the control unit may be configured to control each one of the flow control valve assemblies of the system.

By way of example, the control unit is configured to operate the exhaust flow control valve assembly. That is, the control unit is configured to control the actuator to operate the exhaust flow control valve assembly.

The control unit may be arranged in the powertrain system, in the internal combustion engine system or in another remote location of the vehicle. Thus, the vehicle comprises the control unit.

According to a third aspect of the present invention, there is provided a vehicle comprising a powertrain system and a control unit as described above in relation to the second aspect of the present invention.

The vehicle typically comprises the powertrain system, the internal combustion engine system and the internal combustion engine. The engine typically comprises at least one cylinder at least partly defining a combustion chamber. Further, the engine comprises a reciprocating piston operable between the bottom dead center and the top dead center in the cylinder. The piston is generally connected to a crankshaft housed in a crankcase. Thus, the connecting rod connects the piston to the crankshaft. As the engine typically comprises a number of cylinders, each one of the cylinder also includes any one of the above features relating to the piston, combustion chamber and connecting rod.

According to a fourth aspect of the present invention, there is provided a computer program comprising program code means for performing the steps described above in relation to the first aspect of the present invention when the program is run on a computer.

According to a fifth aspect of the present invention, there is provided a computer readable medium carrying a computer program comprising program means for performing the steps described above in relation to the first aspect of the present invention when the program means is run on a computer.

Effects and features of the third, fourth and fifth aspects are largely analogous to those described above in relation to the first aspect of the present invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein:

FIG. 2b is a schematic drawing of an internal combustion engine system in the vehicle in FIG. 1, the internal combustion engine system being part of the powertrain system in FIG. 2a;

With reference to the appended drawings, below follows a more detailed description of embodiments of the invention cited as examples.

DETAILED DESCRIPTION OF EXAMPLE EMBODIMENTS OF THE INVENTION

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

Figure 1:
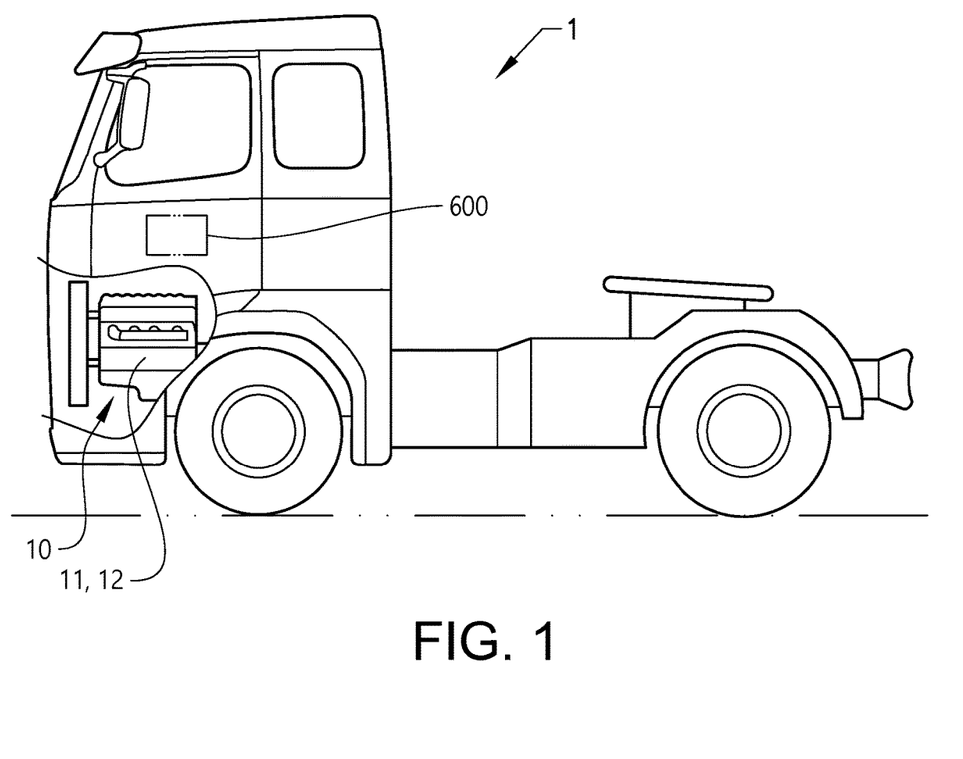
FIG. 1 is a side view of a vehicle in the form of a truck comprising an internal combustion engine system adapted to be operated according to a method of an example embodiment of the present invention.

FIG. 1 is a side view of a vehicle in the form of a truck, such as a heavy-duty truck, in particular a tractor for a semitrailer.

The vehicle 1 in FIG. 1 comprises a powertrain system 10 of a vehicle 1. The powertrain system is adapted to power the vehicle 1. The powertrain system 10 comprises an internal combustion engine system 11, as further described below. The powertrain 10 system is adapted to be operated according to a method of an example embodiment of the present invention, as described in relation to FIG. 3. The internal combustion engine system 11 comprises an internal combustion engine 12. The internal combustion engine 12 is configured to output a rotational speed $W_1$ via an engine output shaft 8, as illustrated in e.g. FIG. 2*a*. The internal combustion engine 12 is generally configured to operate in a conventional four stroke fashion, i.e. operated by an intake stroke, a compression stroke, a combustion stroke, and an exhaust stroke. In addition, as further described hereinafter, the internal combustion engine 12 can be operable in a two-stroke braking operation. In this example embodiment, the internal combustion engine is an internal diesel combustion engine, i.e. an engine designed to work according to the diesel process. By way of example, the internal combustion diesel engine 12 is a compression ignition internal combustion engine.

Since the components of an internal combustion engine are well-known, and the function and configuration of the engine can vary dependent on the type of vehicle, only a brief introduction of the engine will be described for the sake of a better understanding on how the method of the example embodiments can be installed in the internal combustion engine of the vehicle.

Figure 3:
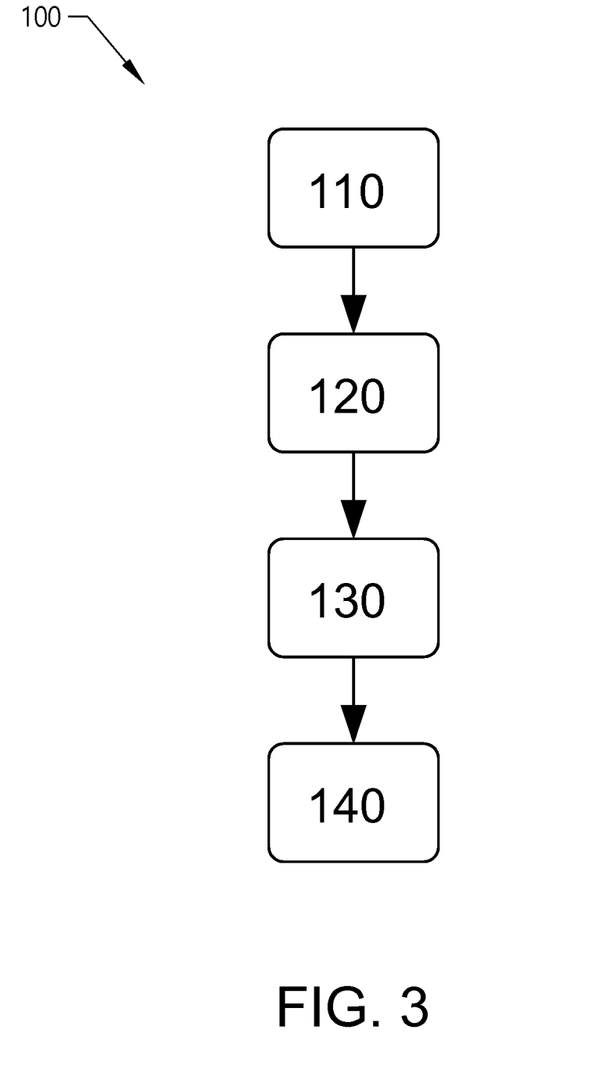
FIG. 3 is a block diagram depicting steps in a method according to an example embodiment of the present invention.

In addition, in this example, the powertrain system 10 comprises a control unit 600 (see FIG. 1) to perform the operational steps of the method according to the example embodiments as described herein, and which are further described in relation to FIG. 3

Figure 2A:
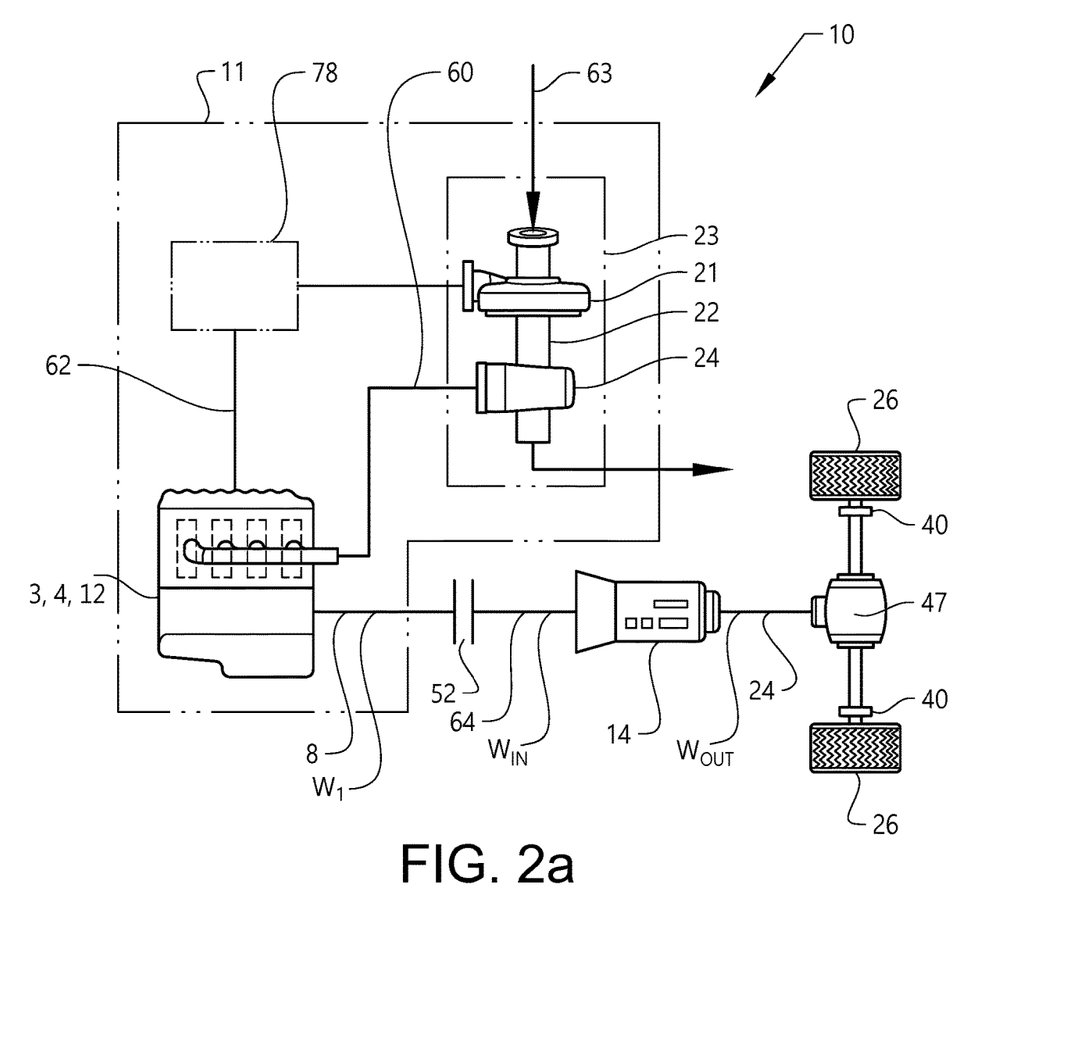
FIG. 2a is a schematic drawing of a powertrain system in the vehicle in FIG. 1.

While now referring to FIG. 2*a*, there is illustrated a schematic drawing of some further components of the powertrain system comprising the internal combustion engine system 11 and the internal combustion engine 12. As shown in FIG. 2*a*, the internal combustion engine system 11 comprises an engine output shaft 8. The internal combustion engine 12 is configured to output a rotational speed W1 via the engine output shaft 8.

Moreover, the powertrain system comprises a transmission arrangement 14. The transmission arrangement 14 has a number of gear stages to obtain a set of gears Gn-Gn+1. Each one of the gears has a corresponding gear ratio. The transmission arrangement may sometimes be denoted simply as the transmission.

The transmission arrangement 14 is operatively connected to the internal combustion engine 12 via a transmission input shaft 64. Therefore, the transmission arrangement comprises the transmission input shaft 64. The transmission input shaft 64 has a corresponding rotational speed $W_{IN}$. The transmission arrangement 14 also has a transmission output shaft 24 for providing a rotational speed Wout to one or more drive wheels 26 of the vehicle 1, as schematically illustrated in FIG. 2*a*, and also in FIG. 1. Briefly stated, the engine output shaft transmits rotational speed from the engine to the transmission arrangement which further transmits the motion via the transmission output shaft to the drive wheels.

The transmission arrangement 14 is in this example an automated manual transmission (AMT), configured to transmit torque to the drive wheels 26. Typically, the transmission arrangement 14 is configured to transmit torque to the drive wheels 26 via the transmission output shaft 24 via a driven wheel shaft or the like. In other words, the vehicle 1 is typically provided with an internal combustion engine operatively connected to the transmission arrangement, such as an automated manual transmission (AMT), for transmitting torque to the vehicle driven wheels.

As illustrated in FIG. 2*a*, the powertrain system also comprises a clutch 52 arranged in-between the engine 12 and the transmission arrangement 14. The clutch 52 thus operatively connects the transmission arrangement 14 with the engine 12. In particular, the engine output shaft 8 is operatively connected to the transmission input shaft 64 via the clutch 52 (when a gear is engaged), as shown e.g. in FIG. 2*a*. It is also conceivable that the transmission arrangement may include the clutch 52 configured for transmitting the rotational torque from the internal combustion engine to the driven wheel. By way of example, the clutch 52 is one of a single clutch unit, a dual-clutch unit, or any other type of multi-clutch unit.

Typically the transmission arrangement is controlled by the driver or automatically via an electronic control unit (ECU). The ECU may be provided with control algorithms for controlling the transmission. By way of example, the control unit 600 includes the ECU of the transmission.

As is commonly known in the art, the transmission arrangement and the clutch are operable to select a gear ratio between the internal combustion engine and a pair of the driven wheels. As shown in FIG. 2*a*, the vehicle is depicted with a pair of wheels 26. However, the vehicle typically also comprises at least an additional pair of wheel, although not shown in FIG. 2*a*.

Optionally, the vehicle includes a differential function 47 arranged in-between the pair of driven wheels 26 and the transmission arrangement. The differential function is a well-known standard component and thus not further described herein. Moreover, the vehicle optionally includes a service brake unit 40. The service brake unit 40 may be a wet brake type or a dry brake type. The service brake unit is typically configured for performing a brake function. As an example, the service brake unit is a wheel brake. In addition, a service brake unit may be provided for each wheel 26.

Typically, the internal combustion engine system 11 also comprises a turbocharger arrangement 23. The turbocharger arrangement is disposed in an exhaust passage 60. The exhaust passage 60 is connected to one or several exhaust channel(s) 72, as mentioned below in relation to FIGS. 2*b* and 2*c*. In particular, the turbocharger arrangement 23 is disposed in the exhaust passage 60 and downstream the engine 12. The turbocharger arrangement 23 comprises a turbine 24. In this manner, the turbocharger is configured to expand the exhaust gases supplied to the turbine via the exhaust passage 60. As illustrated in FIG. 2*a*, the turbocharger arrangement 23 comprising the turbine is operatively connected to a compressor 21 via a turbocharger shaft 22. The compressor is thus powered by the turbine via the turbocharger shaft 22. The turbine 24 is driven by the exhaust gas from the engine. The turbine is thus configured to operate the compressor 21 by using the exhaust gases and via the turbocharger shaft 22.

The compressor 21 is disposed in an inlet air passage 62. Thus, while referring again to FIG. 2*a*, the internal combustion engine system 11 optionally also comprises the air inlet passage 62. The air inlet passage has an air inlet opening 63 for receiving fresh air to the air inlet passage. The air inlet passage 62 is configured to provide air to the internal combustion engine 12. Optionally, a charge air cooler is disposed in the air inlet passage 62. The charge air cooler 78 is disposed downstream of the compressor 21, as illustrated in the FIG. 2*a*. The air inlet passage 62 is typically connected to one or several inlet channel(s) 71 of the cylinders of the engine 12, as further described in relation to FIG. 2*b*. The powertrain system and the internal combustion engine system may also comprise additional components depending on type of vehicle and type of powertrain system.

Figure 2B:
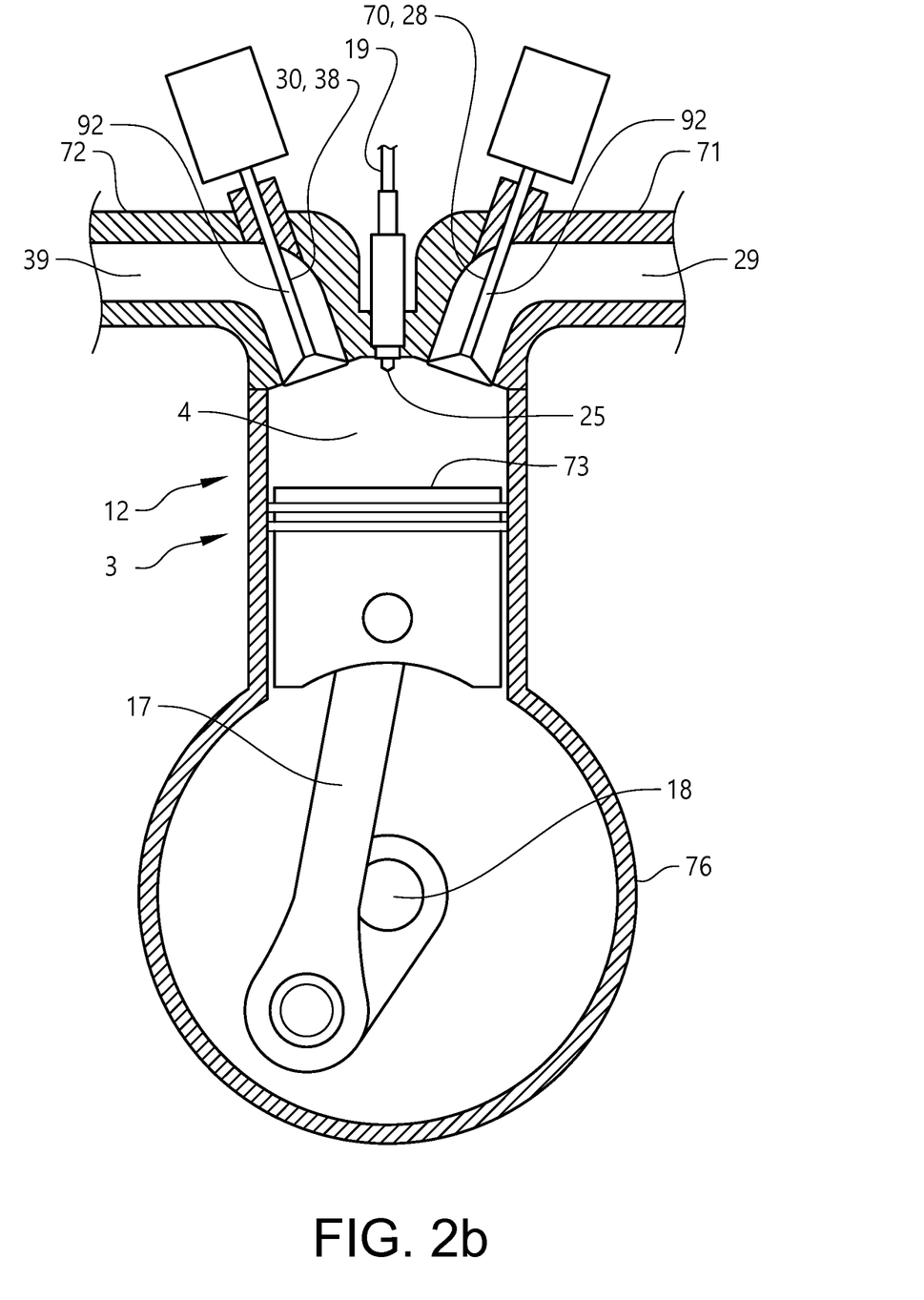

Turning now to the parts of the engine 12, FIG. 2*b* depicts one cylinder of the engine in the vehicle in FIG. 1. As illustrated in FIG. 2*b*, the engine 12 generally comprises the cylinder 3 and a reciprocating piston member, which is often simply denoted as the piston 73. Typically, the internal combustion engine includes a plurality of cylinders, e.g. six to eight cylinders 3, each one having a corresponding piston 73.

The piston 73 reciprocates in the cylinder and is connected to a crankshaft 18 so that the piston is set to reverse in the cylinder at an upper and lower dead centre position. As is also common, one end of the cylinder cavity is closed by an engine cylinder head.

The cylinder 3 is only described in general terms since its parts and functionality is well known in the art. The cylinder configuration may be e.g. straight, V-shaped or any other suitable kind. Each cylinder 3 of FIG. 2*b* comprises at its vertical top end at least one and typically a multiple number of inlet channels 71 for inlet air, and at least one and typically a multiple number of exhaust channels 72 for exhaust gases from the fuel combustion process taking place within the cylinder 3. The exhaust channel(s) typically interconnect(s) with an exhaust passage 60, as illustrated in FIG. 2*a*. Each inlet channel 71 has an inlet valve 70 for controlled inlet of inlet air, and each exhaust channel 72 has an exhaust valve 30 for controlled outlet of exhaust gases. Located centrally in the cylinder 3, between the inlet channel(s) 71 and the exhaust channel(s) 72 there is an injection valve 19 arranged, which at its tip has a fuel injector 25. Thus, in order to inject fuel into a combustion chamber of a combustion engine cylinder of the internal combustion engine, the engine typically comprises the fuel injector. However, it should be readily appreciated that the engine may include a plurality of injectors for injecting fuel into a combustion chamber of a combustion engine cylinder. The piston 73 is connected to a connection rod 17, which in turn is connected to the crankshaft 18. The crankshaft 18 is located within a crankcase 76. The combustion causes the piston 73 to reciprocate between its uppermost position, a so called top dead center, TDC, and its lowermost position, the bottom dead center, BDC. In FIG. 2*b* the piston 73 is located close to its BDC. The volume within the cylinder 3 between the BDC of the piston 73 and the cylinder top is called the combustion chamber 4. This is where i.a. combustion of fuel takes place.

The piston is provided in its upper surface with a piston bowl, which forms the combustion chamber together with an inner surface of the cylinder head and walls of the cylinder. In other words, a combustion interface is formed between the combustion chamber and the cylinder head.

Figure 2C:
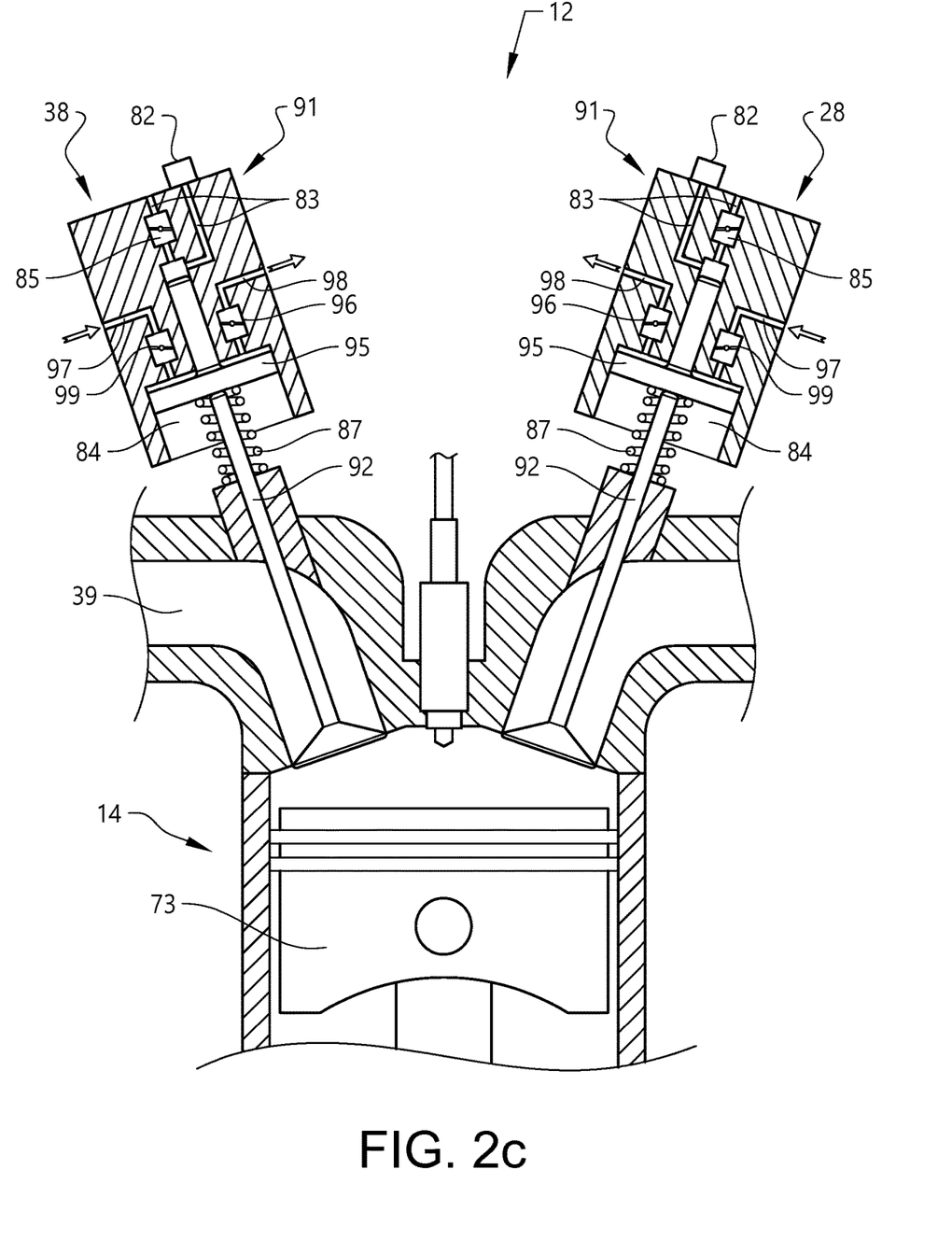
FIG. 2c schematically illustrates parts of an example of a flow control valve assembly, which is intended for controlling a flow of a fluid medium in an internal combustion engine system.

Referring again to FIG. 2*b* and also to FIG. 2*c*, the engine 12 further comprises in each cylinder 3 at least one exhaust valve 30 and at least one inlet valve 70. The exhaust valve is arranged to control a communication between the respective cylinder 3 and an exhaust channel or exhaust passage. Typically, the engine 12 comprises a number of exhaust valves 30 in fluid communication with the combustion chamber 4 and configured to regulate the evacuation of exhaust gases from the combustion chamber. As will be further described herein, at least one of the exhaust valves 30 is an exhaust flow control valve assembly 38 adapted to regulate the flow of a fluid medium passing through the exhaust flow control valve assembly. In this example embodiment, each one of the exhaust valves is provided in the form of an exhaust flow control valve assembly.

The inlet valve 70 is arranged in fluid communication with the combustion chamber 4 and configured to regulate the supply of an incoming fluid medium to the combustion chamber 4. Typically, the engine comprises a number of inlet valves 70 being in fluid communication with the combustion chamber 4 and configured to regulate the supply of the incoming fluid medium to the combustion chamber 4. The fluid medium is a working fluid medium and typically refers to a premixed working fluid medium that may contain air, fuel, burnt gases, other combustion influencing fluid mediums and/or a mixture thereof. In this example, the incoming fluid medium is air. In particular, the incoming fluid medium is pressurized air.

Typically, at least one of the inlet valves 70 is an inlet flow control valve assembly 28 adapted to regulate the flow of a fluid medium passing through the inlet flow control valve assembly. Further, each one of the inlet valves is provided in the form of an inlet flow control valve assembly.

One example of a flow control valve assembly 28, 38 is shown in FIG. 2*c*. This type of flow control valve assembly is one conceivable example embodiment of a flow control valve assembly intended for the system and the method as described herein in relation to the FIG. 3. The flow control valve assembly can be arranged as the inlet valve 70, thus denoted as the inlet flow control valve assembly 28 or as the exhaust valve 30, and thus denoted as the exhaust flow control valve assembly 38. In this embodiment, and in the description in relation to FIG. 2*c*, both inlet and exhaust flow control valve assemblies are of the same type, and the description is therefore applicable to both of them. The flow control valve assembly 28, 38 can be controlled in various manners. Typically, although not strictly necessary, the valve assembly 38 comprises an actuator 91 operatively connected to a valve member 92 and configured to operate the valve member by means of a pneumatic pressure. The actuator 91 is typically configured to control the opening and closure of the valve member at a given point in time. By way of example, the actuator 91 is typically configured to control the opening and closure of the valve member at a given point in time by receiving a signal from the control unit 600 or the like. Hence, in this example embodiment, the flow control valve assembly 28, 38 is a pneumatic flow control valve assembly. If the flow control valve assembly is a pneumatic flow control valve assembly, each one of the flow control valve assemblies 28, 38 is typically in fluid communication with a common air compressor (not shown), or a corresponding separate air compressor, being configured to supply compressed air to the corresponding flow control valve(s).

The valve member 92 is here a lift type valve member. By way of example, the lift type member can be a conventional poppet valve or the like, as shown in FIGS. 2*b* and 2*c*. However, the valve member may likewise be provided as a rotational type valve member, a slide valve member, a seat valve member or the like. The actuator 91 of the valve is configured to operate the valve member 92 by pneumatic pressure. As such, the valve member 92 is a pressure activated valve member. In this example, each one of the flow control valve assemblies 28, 38 comprises a pneumatic actuator operatively connected to a corresponding valve member.

In particular, as shown in FIG. 2*c*, the actuator 91 of the valve assembly is configured to operate the valve member via an actuator piston 95. The actuator 91 is in fluid communication with a pressurized air medium (not shown) via an air inlet 97 and an air outlet 98. In this manner, the pneumatic valve actuation utilizes compressed air to control the valve opening of the valve member, i.e. to operate the valve member between an open fluid medium state and a closed fluid medium state. Accordingly, the actuator 91 comprises at least the air inlet 97 for the pressure fluid medium and at least the air outlet 98 for the pressure fluid medium. The pressurized air flowing in via the air inlet 97 is directed towards the actuator piston 95 by a means of an air inlet valve 99. The air inlet valve 99 is disposed in the air inlet and configured to open and close the air inlet so as to control the flow of air to the actuator piston 95. Further, there is disposed an air outlet valve 96 in the air outlet 98, which is configured to open and close the air outlet in order to permit air to discharge from the actuator. Typically, as shown in FIG. 2c, the actuator piston 95 is disposed in a chamber 84 defining a space for a reciprocating movement of the actuator piston 95. The actuator piston 95 is operable between a first position (an upper position), in which the valve member 92 is in the closed state, and a second position (a lower position), in which the valve member 92 is in the open state. In FIG. 2c, the actuator is in the upper position, i.e. in the closed state. The actuator piston 95 is operable between the first position (upper position) and the second position (lower position) by pressurizing and depressurizing the actuator. In addition, the flow control valve comprises a spring 87 arranged in-between the valve member 92 and the actuator piston disc 95 so as to return the valve member to its original position, i.e. corresponding to the upper position of the actuator piston disc 95.

The flow control valve assembly 28, 38 may also have a hydraulic circuit 83 comprising a hydraulic circuit chamber. The purpose of the hydraulic circuit is to further control or dampening the movement of the actuator piston disc 95. The hydraulic circuit can be controlled by the hydraulic valve 85.

Moreover, the flow control valve assembly 28, 38 can include a control valve unit 82 to control the operation of the flow control valve assembly upon a signal from the control unit 600. By way of example, the actuator 91 is configured to operate upon the signal received from the control unit 600 to the control valve unit 92. The control valve unit may also include a sensor arrangement or the like to monitor the various components of the flow control valve assembly. Also, the control valve unit 82 is typically configured to control the various components of the flow control valve assembly, as mentioned above.

It should be readily appreciated that although the example embodiment above relates to a system in which each one of the inlet valves and each one of the exhaust valves is a flow control valve assembly, it may be sufficient that only one of the exhaust valves is a flow control valve assembly for performing the method as described in relation to FIG. 3.

Turning now to the operation of the powertrain system 10, in particular the operation of the internal combustion engine system 11, there is depicted one example embodiment of the sequences of a method in FIG. 3, which is intended for controlling a powertrain system according to the present invention. Hence, with reference to FIG. 3, there is provided a method for controlling the powertrain system 10 of the vehicle 1, as described in relation to the FIGS. 1 and 2a-2c. In particular, there is provided a method for controlling such powertrain system during gear upshifting. As mentioned above, the powertrain system comprises the internal combustion engine system 11 comprising the internal combustion engine 12 configured to output the rotational speed W1 via the engine output shaft 8. In addition, the powertrain system comprises the transmission arrangement 14 having a number of gear stages to obtain a set of gears, each one of the gears having a corresponding gear ratio. Also, the transmission arrangement 14 is operatively connected to the internal combustion engine via the transmission input shaft 64 and further having the transmission output shaft 24 for providing the rotational speed to one or more drive wheels 26 of the vehicle.

In particular, the method comprises the steps of:

operating 110 the engine in a four-stroke operation to provide engine rotational speed output via the engine output shaft;

receiving 120 an indication of an intended upshifting from a gear $G_i$ of the set of gears to a higher gear $G_n$ of the sets of gears;

reducing 130 the rotational speed of the engine output shaft by adjusting the operation of the engine from the four-stroke operation to a two-stroke braking operation; and when the engine is in the two-stroke braking operation, performing 140 the intended upshifting from the gear $G_i$ of the set of gears to the higher gear $G_n$ of the sets of gears.

As mentioned above, the powertrain system 10 typically comprises the clutch 52 for operatively connecting the engine 12 to the transmission arrangement 14. Thus, the method generally comprises the step of decoupling the engine output shaft 8 from the transmission input shaft 64 by the clutch 52 prior to the step 130 of reducing the rotational speed of the engine output shaft 8 by adjusting the operation of the engine from the four-stroke operation to the two-stroke braking operation. In other words, the engine output shaft 8 is disconnected from the transmission arrangement 14 prior to the step 130 of reducing the rotational speed of the engine output shaft.

Further, the step 130 of reducing the rotational speed of the engine output shaft is typically performed until the rotational speed of the engine output shaft is in a synchronous condition with a predetermined transmission input shaft rotational speed of the higher gear. The higher gear $G_n$ refers to either the next-coming higher gear $G_{i+1}$, having a lower gear ration than the gear $G_i$ or another higher gear $G_{i+2}$ having an even lower gear ration than the gear $G_{i+1}$ and the gear $G_i$. Thus, the transmission arrangement may either perform a one-step gear shift or a two-step gear shift.

Alternatively, or in addition, the step of reducing 130 the rotational speed of the engine output shaft is performed until the rotational speed of the engine output shaft is in a synchronous condition with a predetermined transmission output shaft rotational speed of the higher gear. In this manner, the upshifting in step 140 can be performed without using a clutch.

Thus, it is also conceivable that the method can be used in a configuration when the engine and the transmission arrangement are directly coupled without a clutch. In this type of configuration, the engine is operable to directly synchronize with the engine input shaft. Further, in this example, the gears of the transmission arrangement are in a disengaged state prior to the step of reducing the rotational speed of the engine output shaft. By way of example, the intended upshifting from the gear $G_i$ of the set of gears to the higher gear $G_n$ of the sets of gears is performed by setting the transmission arrangement in a neutral position N and thereafter directly synchronizing the engine output shaft rotational speed $W_1$ with the transmission input shaft rotational speed $W_{IN}$.

As should be readily appreciated from the description herein, the step 130 of reducing the rotational speed of the engine output shaft typically corresponds to an engine braking operation. The engine braking operation is thus performed by adjusting the operation of the engine from the four-stroke operation to the two-stroke braking operation. This step of the method can be performed in several different manners. By way of example, the step 130 can be performed by controlling one or a number of exhaust flow control valve assemblies 38, as described in relation to FIGS. 2b-2c. That is, the step 130 of reducing the rotational speed of the engine output shaft by adjusting the operation of the engine from the four-stroke operation to the two-stroke braking operation is typically performed by controlling the at least one flow control valve assembly 38 to open at least one of the exhaust valves.

In a conventional configuration of the cylinder 3 of the engine 11, there are typically two exhaust valves 30 in fluid communication with the cylinder 3. That is, each one of the cylinders 3 of the engine 11 has two exhaust valves 30 in fluid communication with the corresponding cylinder 3. In this type of configuration, the step 130 of reducing the rotational speed of the engine output shaft by adjusting the operation of the engine from the four-stroke operation to the two-stroke braking operation can be performed by controlling either one of the exhaust valves or both of the exhaust valves. Further, the exhaust flow control valve assembly can either control one of the exhaust valves or both of the exhaust valves. However, there is normally one exhaust flow control valve assembly 38 for each one of the exhaust valves.

Typically, although not strictly required, the step 130 of reducing the rotational speed of the engine output shaft by adjusting the operation of the engine from the four-stroke operation to the two-stroke braking operation also includes the step of controlling an inlet flow control valve assembly 28 to open at least one of the inlet valves 70.

Moreover, the two-stroke braking operation is a non-firing two-stroke operation. That is, there is typically no firing (ignition) during the two-stroke braking operation.

As mentioned above in relation to FIGS. 2a and 2b, the engine system 11 comprises at least one cylinder 3 comprising the combustion chamber 4 and a number of exhaust valves 30 in fluid communication with the combustion chamber. The exhaust valves are each configured to regulate the evacuation of exhaust gases from the combustion chamber 4. Moreover, at least one of these exhaust valves is a flow control valve assembly adapted to regulate the flow of a fluid medium passing through the flow control valve assembly. That is, the step 130 of reducing the rotational speed of the engine output shaft by adjusting the operation of the engine from the four-stroke operation to the two-stroke braking operation is performed by controlling the flow control valve assembly 38 to open at least one of the exhaust valves. By way of example, the step 130 of reducing the rotational speed of the engine output shaft by adjusting the operation of the engine from the four-stroke operation to the two-stroke braking operation is performed by operating the actuator 91 (see FIG. 2c) of the flow control valve assembly. The actuator can operate the valve member 92 in several different manners. For example, the actuator 91 of the flow control valve assembly is configured to control a valve parameter relating to any one of valve opening size, valve opening timing, valve opening duration, flow area, flow time, valve lift or a combination thereof. Thus, the step 130 of reducing the rotational speed of the engine output shaft by adjusting the operation of the engine from the four-stroke operation to a two-stroke braking operation is typically performed by operating the actuator of the exhaust flow control valve assembly 38 to control a valve parameter relating to any one of valve opening size, valve opening timing, valve opening duration, flow area, flow time, valve lift or a combination thereof.

Moreover, the actuator 91 is typically configured to control the opening and closure of the exhaust valve 30 (i.e. the valve member 92 in FIG. 2c) at a given point in time. By way of example, the actuator 91 is typically configured to control the opening and closure of the exhaust valve at a given point in time by receiving a signal from the control unit 600 or the like. Typically, the actuator 91 is typically configured to control the opening and closure of the exhaust valve in response to receiving the indication of the intended upshifting. The indication of the upshifting is typically transmitted from the control unit 600 to a controller on the actuator, as described in relation to FIG. 3.

By means of the control of the exhaust flow control valve assembly 38 in step 130, as mentioned above, it becomes possible to control the passage of fluid medium in the exhaust channel in a more efficient manner, thus allowing the engine to switch from the four-stroke operation to the two-stroke braking operation. Generally, in the two-stroke braking operation, the exhaust valve(s) typically open(s) four times per 720 CAD. The first opening of the exhaust valve during the two-stroke braking operation occurs when the piston moves from the BDC position to the TDC position. In this position, the exhaust valve is opened to receive a fluid medium, such as compressed air, from the exhaust channel of the powertrain system. The second opening of the exhaust valve during the two-stroke braking operation typically occurs when the piston is just before the TDC position. In this position, the exhaust valve discharges burnt gases to the exhaust channel.

When the engine comprises a plurality of cylinders, the step 130 of reducing the rotational speed of the engine output shaft by adjusting the operation of the engine from the four-stroke operation to the two-stroke braking operation is performed sequentially per cylinder until each one of the cylinders of the plurality of cylinders is performing a two-stroke cycle. Typically, this sequence of switching from the four-stroke operation to the two-stroke braking operation for the number of cylinders is performed during 720 crank angles degrees, which corresponds to two revolutions of the crank shaft.

When the powertrain system 10 further comprises the turbocharger arrangement 23 as mentioned above, the method typically comprises the step of providing a flow of exhaust gases to the turbine 24 during the step 140 of performing the intended upshifting. In this manner, the turbine is capable of operating the compressor when the engine is in the two-stroke braking operation.

In other words, the exhaust gases expelled from the engine when the exhaust valve is open and the engine is operating in the two-stroke braking operation (i.e. step 130) is used for propelling the turbocharger.

By way of example, the step 130 of reducing the rotational speed of the engine output shaft by adjusting the operation of the engine from the four-stroke operation to the two-stroke braking operation is performed within one third of an engine output shaft revolution as defined from the start of the step of adjusting the operation of the engine from the four-stroke operation to the two-stroke braking operation.

Moreover, the switch from the four-stroke operation to the two-stroke braking operation can be performed at several different states of the combustion cycle. By way of example, the step 130 of reducing the rotational speed of the engine output shaft by adjusting the operation of the engine from the four-stroke operation to the two-stroke braking operation can be initiated during intake stroke, after the intake stroke or during compression stroke.

It is to be noted that any one of the steps of the method as described above in relation to FIG. 3 can be performed by the control unit 600. As mentioned above, the flow control valves are typically controllable by the control unit 600.

Accordingly, in step 130, the actuator 91 controls the flow control valve assembly 38 to partly exhaust burnt gases to the exhaust passage, thereby reducing the pressure in the cylinder. That is, at least one of the exhaust valves is set in the open position to permit partly burnt gases to expel from the cylinder via the at least one exhaust valve. Thus, the flow control valves are particularly useful in step 130.

Also, it would be conceivable to combine the various designs of the valve combinations as mentioned above. For instance, each cylinder may comprise one inlet flow control inlet valve assembly 28 and one exhaust flow control valve assembly 38. In another design variant, the system comprises a number of flow control inlet valve assemblies 28 and a number of flow control exhaust valve assemblies 38. In other words, several different inlet and exhaust valves combinations are conceivable in accordance with the present invention.

It is also to be noted that the inlet and exhaust valves not provided as flow control valve assemblies may at least be controlled so as to switch between an open and closed state. Hence, one or several numbers of the valves may be provided in the form of one or several conventional valve(s) controllable by the control unit 600. As an example, one or several numbers of the valve(s) may be poppet type valve(s).

Accordingly, in step 130, at least one of the exhaust valves 30 is kept open to allow partly burnt exhaust gases expel from the cylinder 3 of the engine and through the exhaust passage 60. Accordingly, in step 130, exhaust gases produced during combustion are partly expelled from the cylinder 3 by means of the flow control valve assembly 38.

In the example when the flow control valve assembly comprises the actuator 91 and the valve member 92, the step 130 as mentioned above relating to reducing the engine rotational speed by switching from the four-stroke operation to the two-stroke braking operation is performed by controlling the actuator 91 which is operatively connected to the valve member 92 of the exhaust flow control valve assembly 38. The valve member 92 is thus adapted to control and adjust at least the fluid medium passage 39 (as shown in FIG. 2b) in response to the operation of the actuator 91. That is, the valve member 92 is thus adapted to control and adjust at least the flow of fluid in the exhaust channel 72 (see FIG. 2b), and thus the flow of fluid in the exhaust passage 60 (see FIG. 2a).

Further, as mentioned above, the flow control valve assembly 38 is configured to control a valve parameter relating to any one of valve opening size, valve opening timing, valve opening duration, flow area, flow time, valve lift or a combination thereof. Typically, although strictly not necessary, the step 130 of reducing the rotational speed of the engine output shaft by adjusting the operation of the engine from the four-stroke operation to a two-stroke braking operation is performed by controlling the actuator 91 of the exhaust flow control valve assembly 38, which is operatively connected to the valve member 92 of the exhaust flow control valve assembly 38, so that the valve member adjust the flow area in order to exhaust a portion of exhaust gases to the exhaust passage 60, and typically to the turbocharger arrangement. The valve member is adapted to regulate the valve opening 93 upon a signal from the actuator, which is typically generated by the control unit, e.g. the control unit 600.

It is to be understood that the present invention is not limited to the embodiments described above and illustrated in the drawings; rather, the skilled person will recognize that many changes and modifications may be made within the scope of the appended claims.

The invention claimed is:

1. A method for controlling a powertrain system of a vehicle during gear upshifting, said powertrain system comprising:
    an internal combustion engine system comprising an internal combustion engine configured to output a rotational speed via an engine output shaft;
    a transmission arrangement having a number of gear stages to obtain a set of gears, each one of the gears having a corresponding gear ratio, said transmission arrangement being operatively connected to the internal combustion engine via a transmission input shaft and further having a transmission output shaft for providing a rotational speed to one or more drive wheels of the vehicle,
    wherein said powertrain system further comprises a turbocharger arrangement having a turbine receiving exhaust gases from the internal combustion engine and a compressor for compressing intake air and feeding said intake air via an air intake line to said internal combustion engine, said turbine being configured to convert engine exhaust gas into mechanical energy to drive the compressor; the method comprising the steps of:
        operating the internal combustion engine in a four-stroke operation to provide engine rotational speed output via the engine output shaft;
        receiving an indication of an intended upshifting from a gear of the set of gears to a higher gear of the sets of gears;
        reducing the rotational speed of the engine output shaft by adjusting the operation of the internal combustion engine from the four-stroke operation to a two-stroke braking operation by controlling an inlet flow control valve assembly to open at least one inlet valve;
        when said internal combustion engine is in the two-stroke braking operation, performing the intended upshifting from said gear of the set of gears to said higher gear of the sets of gears and providing a flow of exhaust gases to the turbine during said step of performing the intended upshifting, thereby allowing the turbine to operate the compressor when said engine is in the two-stroke braking operation; and
        during each crankshaft revolution in the two-stroke braking operation, operating an exhaust flow control valve assembly to open in a first opening, when a piston moves from a bottom dead center, BDC, position to a top dead center, TDC, position, so as to receive fluid medium from an exhaust channel, and in a second opening, when the piston is just before the TDC position.

2. Method according to claim 1, wherein the step of reducing the rotational speed of the engine output shaft is performed until the rotational speed of the engine output shaft is in a synchronous condition with one of a predetermined transmission input shaft rotational speed and a predetermined transmission output shaft rotational speed of the higher gear.

3. Method according to claim 1, wherein the intended upshifting from said gear of the set of gears to said higher gear of the sets of gears is performed by setting the transmission arrangement in a neutral position and directly synchronizing engine output shaft rotational speed with the transmission input shaft rotational speed.

4. Method according to claim 1, wherein the powertrain system further comprises a clutch for operatively connecting the engine to the transmission arrangement, the method comprising the step of:
- decoupling the engine output shaft from the transmission input shaft by said clutch prior to the step of reducing the rotational speed of the engine output shaft by adjusting the operation of the engine from the four-stroke operation to the two-stroke braking operation.

5. Method according to claim 1, wherein the engine system comprises at least one cylinder having a combustion chamber and a number of exhaust valves in fluid communication with the combustion chamber and configured to regulate the evacuation of exhaust gases from the combustion chamber, wherein any one of the exhaust valves comprises a flow control valve assembly adapted to regulate the flow of a fluid medium passing through the flow control exhaust valve.

6. Method according to claim 5, wherein the step of reducing the rotational speed of the engine output shaft by adjusting the operation of the engine from the four-stroke operation to the two-stroke braking operation is performed by controlling the flow control valve assembly to open at least one of the exhaust valves.

7. Method according to claim 6, wherein the step of reducing the rotational speed of the engine output shaft by adjusting the operation of the engine from the four-stroke operation to the two-stroke braking operation is performed by operating an actuator of the flow control valve assembly.

8. Method according to claim 1, wherein the step of reducing the rotational speed of the engine output shaft by adjusting the operation of the engine from the four-stroke operation to the two-stroke braking operation is initiated during an intake stroke, after an intake stroke or during a compression stroke.

9. Method according to claim 1, wherein when the engine comprises a plurality of cylinders, the step of reducing the rotational speed of the engine output shaft by adjusting the operation of the engine from the four-stroke operation to the two-stroke braking operation is performed sequentially per cylinder until each one of the cylinders of the plurality of cylinders is performing a two-stroke cycle.

10. Method according to claim 1, wherein the two-stroke braking operation is a non-firing two-stroke operation.

11. A control unit for controlling a powertrain system, wherein the control unit is configured to perform any one of the steps of the method according to claim 1.

12. A vehicle comprising a powertrain system and a control unit according to claim 11.

13. A computer program comprising program code means for performing the steps of claim 1 when said program is run on a computer.

14. A computer readable medium carrying a computer program comprising program means for performing the steps of claim 1 when said program means is run on a computer.

* * * * *